United States Patent [19]

Narduzzi

[11] Patent Number: 4,667,929
[45] Date of Patent: May 26, 1987

[54] CUTOFF VALVE, PARTICULARLY FOR THE CUTOFF OF HIGH-TEMPERATURE FLUIDS

[76] Inventor: Franco Narduzzi, Viale Cairoli, 18, Fiorenzuola D'Arda, Piacenza, Italy

[21] Appl. No.: 903,172

[22] Filed: Sep. 3, 1986

[30] Foreign Application Priority Data

Sep. 10, 1985 [IT] Italy ............................. 22106 A/85

[51] Int. Cl.⁴ ............................................. F16K 5/06
[52] U.S. Cl. ................................... 251/315; 251/192; 251/317
[58] Field of Search ............... 251/314, 315, 317, 163, 251/170, 192, 298, 333

[56] References Cited

U.S. PATENT DOCUMENTS

| | | | |
|---|---|---|---|
| 3,379,408 | 4/1968 | Lowrey | 251/333 |
| 3,883,113 | 5/1975 | Kolb | 251/315 |
| 4,118,008 | 10/1978 | Myers | 251/298 |
| 4,296,913 | 10/1981 | Hoyer | 251/163 |
| 4,548,384 | 10/1985 | Harding | 251/315 |

Primary Examiner—Martin P. Schwadron
Assistant Examiner—Sheri M. Novack
Attorney, Agent, or Firm—Guido Modiano; Albert Josif

[57] ABSTRACT

The valve comprises a valve body defining a valve chamber having input and output openings, and housing a rotatable shutter element, traversed by a passage, adapted for selectively connecting the input and output openings. Provided between at least one of the openings and the shutter element, is a sealing seat having a truncated-cone shape with its axis lying in a plane, substantially perpendicular to the axis of rotation of the shutter element and inclined with respect to the axis of the opening. The sealing seat has, in a plane which is perpendicular to the axis of the opening an ellipse portion, placed eccentrically with respect to the axis of the opening, with the eccentricity arranged along the major axis of the ellipse on the part which is opposite with respect to the position of the apex of the cone relatively to the axis of the opening. On the shutter element, a sealing ring is provided, for engagement with the sealing seat upon closing the valve.

12 Claims, 5 Drawing Figures

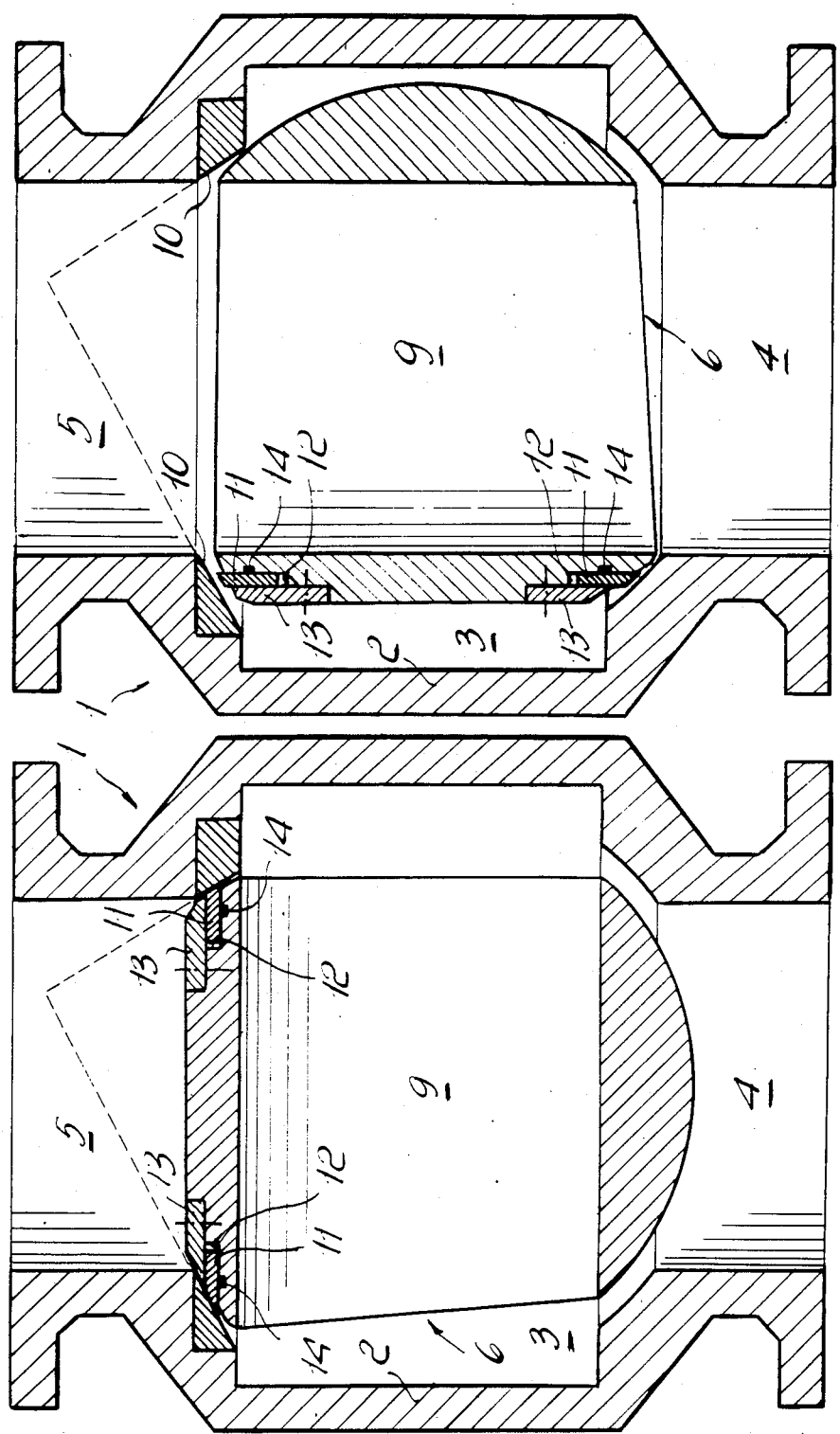

4,667,929

CUTOFF VALVE, PARTICULARLY FOR THE CUTOFF OF HIGH-TEMPERATURE FLUIDS

BACKGROUND OF THE INVENTION

The present invention relates to a cutoff valve, particularly for the cutoff of high-temperature fluids.

Cutoff valves are known with a spherical plug shutter, also commonly termed ball valves, widely used in industry as process valves, generally composed of a valve body which defines internally a valve chamber endowed with an input opening and an output opening, coaxial to each other. The valve chamber houses a substantially spherical shutter element traversed by a passage with a cross section generally equal to the cross section of the openings and supported by two pivots: a lower one, located in the valve body, and an upper one protruding from the valve body, which is used to operate the shutter.

By applying a deflecting torque to the upper pivot, the shutter rotates through 90° and the abovesaid passage can be positioned coaxially with the openings so as to connect them to each other without creating any resistance to the fluid. By rotating the shutter through 90° in the opposite direction, the passage is positioned perpendicular to the openings and the surface of the shutter element exerts a sealing action against two seats arranged at the openings, cutting off the passage of the fluid.

The seats are in metal, and the surface thereof which comes in contact with the shutter is shaped as a spherical segment, with a curvature equal to that of the shutter; however, the sealing action is effected by an elastomer ring located in the seats.

The metal surfaces ensure a rough sealing action in case of emergency, that is to say when e.g. due to a fire, the elastomer ring is burned.

The seats can be pressed against the shutter by a series of springs; the pressure of the fluid adds a further pressing action, so that the specific pressure required for effecting the sealing action is generated between the shutter and the elastomer ring.

These kinds of valve have the disadvantage, due to the fact that the sealing action is performed with an elastomer ring, that they cannot be used for high-temperature fluids and/or with some kinds of fluid which would quickly compromise the integrity of the elastomer ring.

On the other hand, in the case of a seal without the elastomer ring, that is to say in the case of a metal sealing action, the forces generated by ordinary springs are not sufficient to ensure a satisfactory sealing action and cannot be increased beyond a certain limit without compromising the integrity of the seats and/or of the shutter.

To eliminate this disadvantage, valves have been manufactured with a floating shutter, that is to say with a shutter which is no longer guided on pivots but rests against one of the seats, generally against the seat of the output opening.

In this case, the pushing action generated by the pressure of the fluid against the spherical surface of the shutter, is superimposed to the pushing action generated by the springs, when the valve is closed onto the seat. When the pressure reaches a sufficiently high value, the sealing action is ensured.

This kind of valve is, however, not devoid of disadvantages.

At low pressure, the sealing action is very uncertain, while at high pressure the friction of the two metal surfaces in contact, under heavy load, may damage them and cause them to seize, particularly in severe operating conditions, that is to say in the presence of soiled fluids with solid particles or for incipient corrosion due to the fluid.

The elimination of this disadvantage has already been obtained in the known art by dividing in two the motion of the shutter: a 90° rotation (from open to closed) without contact with the seat and a subsequent translation towards the seat. This motion is obtained by shaping appropriately the upper pivot and allowing a preset clearance between the lower pivot and the body of the valve.

In turn, these valves have the disadvantage of being more difficult to operate in the case of automatic driving devices, because of the need to provide two kinds of motion.

SUMMARY OF THE INVENTION

The main aim of the present invention is to eliminate the above described disadvantages, by providing a cutoff valve with a spherical plug shutter which ensures an excellent metal sealing action between the shutter element and the seat, obtaining an adequate specific pressure on the seat itself, being nonetheless operatable by simply rotating the shutter element.

Within the scope of this aim, an object of the invention is to provide a valve which ensures a sealing action even with the deformation of the seats in the case of high-temperature and high-pressure fluids.

Another object of the invention is to minimize the friction between the shutter element and the seats, so as to ensure a longer life of the valve.

This aim, as well as these and other objects which will better appear hereinafter, are achieved by a cutoff valve, particularly for the cutoff of high-temperature fluids, comprising a valve body defining in its interior a valve chamber having input and output openings and housing a substantially spherical shutter element, traversed by a passage, said shutter element being controllably rotatable to connect, by means of said passage, said input and output openings, means being provided for providing the sealing action between at least one of said openings and said shutter element at least upon closing the valve, characterized in that said means comprise a sealing seat defined at least at one of said openings and having a truncated-cone shape with its axis tilted with respect to the axis of said at least one opening and lying in a plane substantially perpendicular to the axis of rotation of said shutter element, said sealing seat having, on a plane perpendicular to said axis of at least one opening, a section in the shape of an ellipse arranged eccentrically with respect to said axis of at least one opening, with the eccentricity arranged along the major axis of the ellipse on the side opposite to the position of the apex of said cone with respect to said axis of at least one opening, being furthermore provided on said shutter element at least one sealing ring with an external surface substantially similar to said sealing seat, and engageable in said sealing seat by rotating said shutter element when closing the valve.

BRIEF DESCRIPTION OF THE DRAWINGS

Further features and advantages of the invention will better appear from the description of a preferred, but not exclusive, embodiment of the valve according to the invention, illustrated, by way of non-limitative example only, in the accompanying drawings, where:

FIG. 1 is a cross section of the valve according to the invention, along a plane perpendicular to the axis of rotation of the shutter element and containing the axes of the input and output openings, with the shutter element in closed position;

FIG. 2 is a cross section of the valve according to the invention, similar to the view of FIG. 1, with the shutter element in an open position;

DESCRIPTION OF THE PREFERRED EMBODIMENTS

Figure 5:
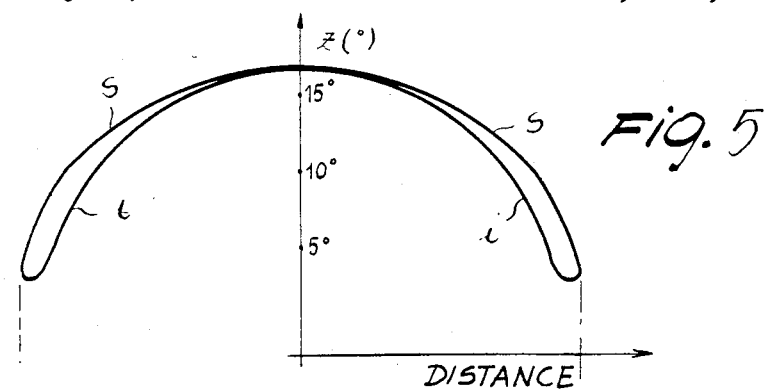
FIG. 5 is the graphic representation of the behaviour of a characteristic measure of the valve according to the invention.
Figure 4:
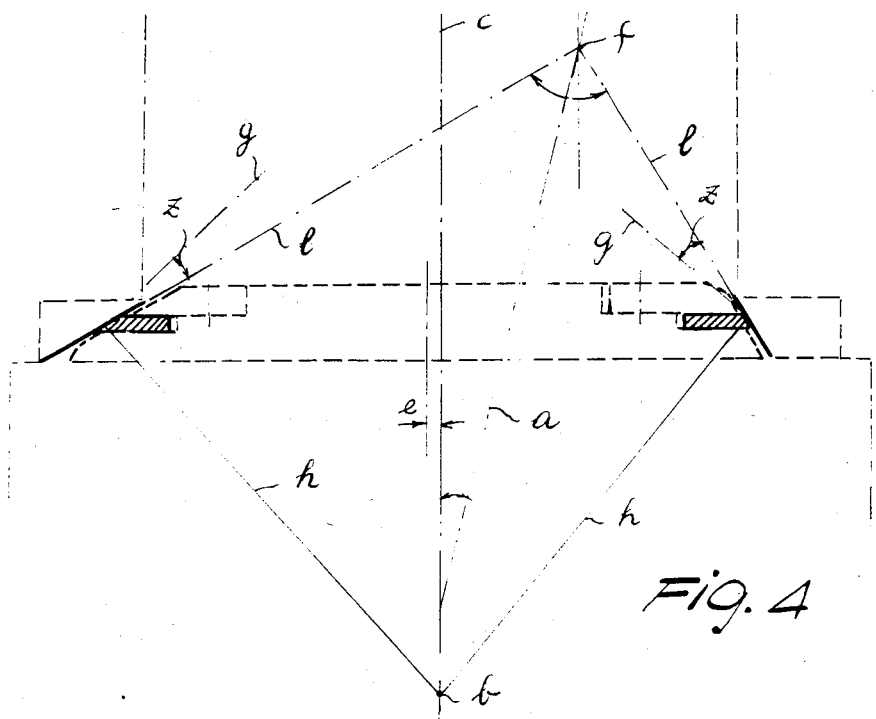
FIG. 4 is a schematic view illustrating the geometry of the sealing seat and of the sealing ring.
Figure 3:
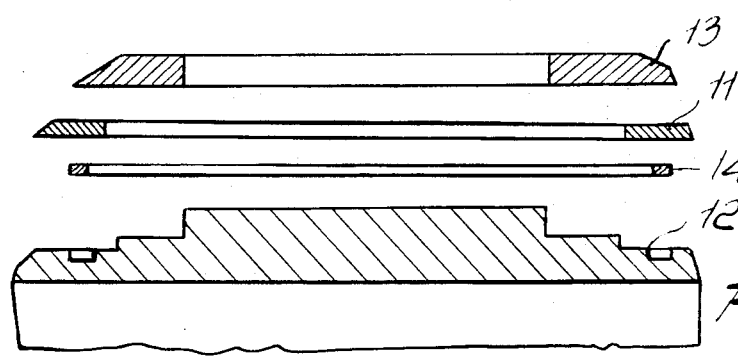
FIG. 3 is an exploded section of a part of the shutter element according to the invention.

With reference to the figures, the cutoff valve according to the invention, indicated generally with the reference numeral 1, comprises a valve body 2 which defines, in its interior, a valve chamber 3, having an input opening 4 and an output opening 5. In the case shown, the input opening is aligned with the output opening. The valve chamber 3 houses a substantially spherical shutter element, indicated generally with the reference numeral 6, which is supported by a lower pivot, internal to the valve body, and by an upper pivot which protrudes from the valve body to allow operation of the shutter. The two pivots, not shown for simplicity, are coaxial to each other and determine an axis of rotation for the shutter element, which is perpendicular to the axes of the input opening 4 and the output opening 5.

The shutter element 6 is traversed by a substantially cylindrical passage 9, with a diameter substantially equal to the diameter of the openings 4 and 5 and with an axis substantially perpendicular to the axis of rotation of the shutter element.

By acting on the upper pivot, it is possible to have the passage 9 align with the openings 4 and 5 by opening the valve; instead, by rotating in reverse the shutter element by 90° the passage is arranged perpendicular to the openings, thus obtaining the closing of the valve.

The valve further comprises means for providing the sealing action between the shutter element 6 and the openings 4 or 5 at least when the valve is closed.

According to the invention, said means are composed of a sealing seat 10, defined at least at one of the openings 4 and 5, in the case shown at the opening 5.

The sealing seat, which is provided in metal or in material composed of metal and other heat-resistant materials such as graphite, asbestos, etc., in the use with fluids at high temperatures and pressures, has a truncated-cone shape, the axis "a" of which lies in a plane substantially perpendicular to the axis of rotation "b" of the shutter element and is tilted with respect to the "c" axis of the opening on which the seat is defined.

More in detail, the axis "a" of the cone is tilted with respect to the axis "c" of the opening of an angle comprised between 10° and 20°, preferably of 15°, and the angle at the apex of the cone is comprised between 70° and 90°, preferably 90°.

By intersecting the sealing seat with a plane perpendicular to the "c" axis of the opening, an elliptical section is obtained and, always according to the invention, the ellipse thus obtained is arranged eccentrically with respect to the axis "c" of the opening with eccentricity "e" located on the major axis of the ellipse, on the side opposite to the position of the apex "f" of the cone relatively to the axis "c" of the opening.

More in detail, the eccentricity "e" is equal to at least 0.025 times the major axis of the ellipse, and from geometrical construction it turns out to be in the same plane which contains the axis of the cone and the axis of the opening.

A smaller eccentricity value would create problems regarding the positioning of the shutter in the seat, while a greater value is acceptable but gives rise to problems in obtaining the sealing action of the fluid in both directions of flow.

The sealing means comprise furthermore a sealing ring 11, which can be made of a metallic material or of metal and heat-resistant material compounds, and is fitted on the shutter element, its lateral outer surface being shaped like the sealing seat 10 in such a way that, in closing position, the sealing ring and the seat engage perfectly.

The sealing ring 11 is held by a supporting seat 12 defined on the shutter element, and a portion of the spherical surface proximate to the seat 12 can be shaped like the sealing seat but with smaller dimensions, to allow the positioning of the sealing ring in the sealing seat without interference.

In particular, a locking flange 13 can be provided, which is removable from the rest of the shutter element to allow the opening of the supporting seat 12 during the insertion of the sealing ring.

The sealing ring 11 is not fixed rigidly in the supporting seat 12 but can move in its plane under the action of the forces generated by the contact with the sealing seat.

The sealing ring has two degrees of freedom in its plane, but can also be compressed, flexed and bent out of its plane, employing the resiliency of the metallic material, assuming a more or less elliptical shape to adapt perfectly to the sealing seat even if the same is deformed due to the high temperature and pressures of the fluid or due to manufacturing errors.

Between the sealing ring and the supporting seat, auxiliary sealing means are provided, composed of a gasket 14 of a known kind, such as, e.g., a "spirotallic" gasket or in the shape of a metal toric ring.

The operation of the valve according to the invention is as follows.

By applying a deflecting torque to the upper pivot of the shutter element, the same rotates, bringing the sealing ring into contact with the sealing seat only at the last moment.

Under the effect of the deflecting torque, the sealing ring is forced to engage perfectly with the sealing seat, generating on the contact surface a specific pressure which is proportional to the torque applied. By increasing appropriately the value of the deflecting torque, the required sealing action is obtained.

Reciprocally, by reversing the action of the torque applied to the pivot, the ring immediately uncouples from its seat, practically without friction.

In practice, it has been observed that the cutoff valve according to the invention fully achieves the intended aim, obtaining with only the rotating motion of the shutter element a pressure sufficient to ensure the sealing action between the sealing ring and the sealing seat, even in the presence of high-temperature and high-pressure fluid.

A further advantage is due to the fact that the forces generated upon closing are essentially symmetrical with respect to the axis of the sealing ring which is parallel to the axis of rotation of the shutter element.

This fact, which will be better described hereinafter, allows a great lifespan of the sealing ring; indeed, during the positioning in the sealing seat, the ring moves, as has been described, in its plane to reach a static equilibrium condition under the effect of the forces generated by the contact, and tends to recover its initial position when it is disengaged.

This motion, if it occurred many times, might damage the sealing ring, and, in order to avoid it, it is necessary for the forces acting on the ring to be symmetrical as has been described.

These forces, in a generic point of the contact surfaces, are proportional to the deflecting torque and to the tangent of the angle of incidence z, i.e. the angle formed in a plane perpendicular to the axis of rotation between the line "g", perpendicular to the line "h" which connects the generic point with the axis of rotation and the line "l" which is tangent to the contact surface.

By performing the calculation of this angle of incidence for various points with planes arranged at various distances from the major axis of the ellipse, the diagram of FIG. 5 is obtained, which points out the behaviour of the angle of incidence according to these distances.

The upper portion "s" of the curve represents the angles of incidence of the semi-seat which is closest to the axis of rotation, and the lower portion "i" those of the semi-seat which is farthest (due to the eccentricity).

Since the two portions are almost superimposable, there is a reasonable symmetry between the angles of incidence and therefore between the forces with respect to the minor axis of the ellipse, furthermore, the fact that the angles of incidence are always positive proves that the positioning and dislocation occur without friction.

The valve thus conceived is susceptible of numerous modifications and variations, all of which are within the scope of the inventive concept; furthermore all the details can be replaced with technically equivalent elements.

Since the valve has been conceived for operating at high temperatures, it has been described with metallic sealing means, granted that the materials, as well as the dimensions, may be any according to requirements and the state of the art.

I claim:

1. A cutoff valve, particularly for the cutoff of high-temperature fluids, comprising a valve body defining in its interior a valve chamber having input and output openings, and housing a substantially spherical shutter element, traversed by a passage, said shutter element being controllably rotatable to connect, by means of said passage, said input and output openings, means being provided for obtaining a sealing action between at least one of said openings and said shutter element, at least upon closing the valve, characterized in that said means comprise a sealing seat defined at least at one of said openings and having a truncated-cone conformation with the axis tilted with respect to the axis of said at least one opening and lying in a plane which is substantially perpendicular to the axis of rotation of said shutter element, said sealing seat having, in a plane perpendicular to said axis of at least one opening, a section in the shape of an ellipse arranged eccentrically with respect to said axis of at least one opening with eccentricity arranged along the major axis of the ellipse on the side opposite to the positioning of the apex of said cone with respect to said axis of at least one opening, furthermore being provided on said shutter element at least one sealing ring with an external surface essentially equal to said sealing seat and engageable in said sealing seat by rotating said shutter element when closing the valve.

2. A cutoff valve, according to claim 1, wherein said cone has an angle at the apex substantially comprised between 70° and 90°.

3. A cutoff valve, according to claim 2, wherein said angle at the apex of said cone is substantially of 90°.

4. A cutoff valve, according to claim 1, wherein said axis of said cone has, with respect to said axis of at least one opening, an inclination substantially comprised between 10° and 20°.

5. A cutoff valve according to claim 4, wherein said inclination is substantially of 15°.

6. A cutoff valve according to claim 1, wherein said eccentricity is substantially equal to at least 0.025 times the major axis of said section in the shape of an ellipse.

7. A cutoff valve according to claim 1, wherein said sealing seat and said sealing ring are made of metallic material.

8. A cutoff valve according to claim 1, wherein said sealing seat and said sealing ring are made of material composed of metal and heat-resistant materials.

9. A cutoff valve according to claim 1, wherein said sealing ring is held by a supporting seat defined on said shutter element.

10. A cutoff valve according to claim 9, wherein said sealing ring is movable in its own plane in said supporting seat due to the action of forces generated by the contact with said sealing seat.

11. A cutoff valve, according to claim 1, wherein said sealing ring is made of resiliently deformable material.

12. A cutoff valve according to claim 9, wherein between said sealing ring and said supporting seat, auxiliary sealing means are provided.

* * * * *